United States Patent
Schmidt

(10) Patent No.: US 6,898,721 B2
(45) Date of Patent: *May 24, 2005

(54) CLOCK GENERATION SYSTEMS AND METHODS

(75) Inventor: Dominik J. Schmidt, Palo Alto, CA (US)

(73) Assignee: Gallitzin Allegheny LLC, Los Altos, CA (US)

( * ) Notice: Subject to any disclaimer, the term of this patent is extended or adjusted under 35 U.S.C. 154(b) by 693 days.

This patent is subject to a terminal disclaimer.

(21) Appl. No.: 09/887,905

(22) Filed: Jun. 22, 2001

(65) Prior Publication Data

US 2003/0014682 A1 Jan. 16, 2003

(51) Int. Cl.⁷ .............................................. G06F 1/04
(52) U.S. Cl. .................... 713/322; 713/501; 713/600; 455/75; 455/205; 455/502
(58) Field of Search ................................ 713/200, 322, 713/500, 501, 600; 455/75, 205, 502

(56) References Cited

U.S. PATENT DOCUMENTS

| | | | |
|---|---|---|---|
| 4,021,784 A | * 5/1977 | Kimlinger | 713/401 |
| 5,117,442 A | * 5/1992 | Hall | 375/356 |
| 5,381,157 A | 1/1995 | Shiga | |
| 5,734,878 A | * 3/1998 | Hongo | 713/600 |
| 5,790,877 A | * 8/1998 | Nishiyama et al. | 713/323 |
| 5,960,331 A | * 9/1999 | Weir et al. | 455/75 |
| 6,047,214 A | 4/2000 | Mueller et al. | |
| 6,047,248 A | * 4/2000 | Georgiou et al. | 702/132 |
| 6,236,278 B1 | 5/2001 | Olgaard | |
| 6,300,881 B1 | * 10/2001 | Yee et al. | 340/870.02 |
| 6,542,754 B1 | * 4/2003 | Sayers et al. | 455/502 |
| 6,560,712 B1 | * 5/2003 | Arends et al. | 713/320 |
| 6,563,448 B1 | * 5/2003 | Fontaine | 341/143 |
| 6,578,155 B1 | * 6/2003 | Faucher et al. | 713/501 |

* cited by examiner

Primary Examiner—Rehana Perveen
(74) Attorney, Agent, or Firm—Sterne, Kessler, Goldstein & Fox P.L.L.C.

(57) ABSTRACT

A low power reconfigurable processor core includes one or more processing units, each unit having a clock input that controls the performance of the unit; a wireless transceiver transmitting and receiving at a frequency based on a wireless clock input; and a controller having a plurality of clock outputs each coupled to the clock inputs of the processing units and the wireless clock input, the clock outputs being generated from a common master clock.

20 Claims, 7 Drawing Sheets

Fig. 5 Example behavior of FIFO empty/near empty with multiple independent clock controls Fig. 6 Example behavior of FIFO empty/near empty with multiple independent clock controls

CLOCK GENERATION SYSTEMS AND METHODS

This application is related to co-pending application Ser. No. 09/887,908, entitled "SYSTEMS AND METHODS FOR TESTING WIRELESS DEVICES," filed concurrently herewith and commonly assigned, the content of which is hereby incorporated by reference.

BACKGROUND

The present invention relates to systems and methods for generating a clock signal.

To address the ever-increasing need to increase the speed of computers to process ever increasing amounts of data, computer designers have increased the clock frequency of a computers central processing unit and/or utilized parallel processing. Many electrical and computer applications and components have critical timing requirements that require clock waveforms that are precisely synchronized with a reference clock waveform. As discussed in U.S. Pat. No. 6,236,278, to generate a high frequency clock from a lower frequency reference clock, a phase-locked loop ("PLL") is typically used to provide an output signal having a precisely controlled frequency that is synchronous with the frequency of a reference or input signal. In microprocessors, for example, an on-chip PLL can multiply the frequency of a low frequency input (off-chip) clock to generate a high frequency output clock that is precisely synchronized with the lower frequency external clock. Due to the high clock frequency, power consumption for each device has also increased. For certain products such as laptop or notebook computers, handheld computers, cellular telephones, and other wireless personal digital assistants that are designed for situations where power outlets are not available, the conservation of power can be important.

In a parallel trend, electronic devices that employ short-range radio links have found their way into the daily lives of many people within the past decade. Widespread applications include cordless phones, keyless entry for automobiles, garage door openers, and file transfer in portable computers. Current uses however, are in general restricted to single devices (two transceivers) or a group of very similar devices (e.g., laptop computers). Two recently initiated industry projects, Bluetooth and HomeRF, promise to broaden the use of wireless connections by specifying standard links for a wide range of electronic devices. Bluetooth and 802.11b radios utilize the publicly available 2.4 GHz ISM frequency band for transmission. Operation in this band does not incur usage fees or licenses and permits global use of Bluetooth and/or 802.11b devices.

Traditionally, multiple integrated circuit chips are required to implement systems offering wireless communications capability. To lower cost, a single chip implementation is needed. However, an integrated circuit with multiple input data ports, the proliferation of multiple phase locked loops and multiple reference clocks may unduly complicate the integrated circuit. Also, a typical digital clock produces a square wave signal in which the harmonics and sub-harmonics occur at the multiples of the clock frequency. With the clock frequency remaining the same, the harmonics are at the same frequency each cycle. These harmonics can interfere with the proper operation of analog components near digital components.

SUMMARY

In one aspect, a low power reconfigurable processor core includes one or more processing units, each unit having a clock input that controls the performance of the unit; a wireless transceiver transmitting and receiving at a frequency based on a wireless clock input; and a controller having a plurality of clock outputs each coupled to the clock inputs of the processing units and the wireless clock input, the clock outputs being generated from a common master clock.

Implementations of the above aspect may include one or more of the following. The master clock can operate at up to several Gigahertz, or the master clock can operate at the Bluetooth operating frequency, or the master clock can operate at the frequency specified by the 802.11 standard. The system uses a plurality of clock signals, each independently rate controlled to single destination processing element, in a system on a chip which comprises multiple such processors. In one implementation, these clocks may be all derivatives of a single master clock. In another implementation, the clocks can be gated versions of a master clock, thus retaining a level of synchronous relationship to each other.

The system can change the clock rate of each processor independently of all the other processors, as a result of a decision or algorithm invoked in order to accomplish some goal, such as power reduction, buffer memory management, or emissions control. The clock rate management may be pre-assigned based upon tasks or routines handled by each processor, or it may be invoked as a result of external or internal system stimuli, including but not limited to user input or thermal management.

The system allows these changes to occur on-the-fly, during normal operation as the processors' tasks or needs vary. The control of each processor's clock rate may or may not be performed in a centralized manner on the chip. Clock rate control need not be limited to simple clock division, but rather may be more sophisticated and flexible so as to obtain rates such as three-eighths or two-thirds of the driving clock.

Each processing element may connect to other processing elements through use of buffer memories or FIFOs. A FIFO, for example, may support isosynchronous or even asynchronous read versus write ports, hence supporting mismatched rate processing elements.

Advantages of the system may include one or more of the following. By clocking the wireless core and processor core using a common reference clock signal, the system simplifies the maintenance of clock signal integrity and minimizes the potential for errors from parasitic reactances, impedance mismatches, crosstalk, dispersion and frequency-dependent skin losses.

The system also varies the clock signal and the clock period to effectively spread undesirable frequency harmonics spurs over the frequency band because the harmonic frequency created by the clock varies over time. The spurious signal energy at the nominal harmonic frequency is reduced and the energy is spread across the spectrum. As a result, spurious signals and other interferences are reduced.

The use of a single clock generator for both processor and wireless clock generation also reduces component count and thus lowers power dissipation. This yields the benefit of longer usage time per battery replacement or charging; reduced weight and size by use of fewer and/or smaller batteries; reduced thermal and electromagnetic emissions; and increased reliability. The system is ideal for battery-operated processor-based equipment, where it is desirable to minimize battery size so that the equipment can be made small and lightweight. The reduction is due to the fact that the functional units are not kept on when they are not needed. Since CMOS technology is used, power is only consumed when a functional unit is changing state (i.e., switching). Since a functional unit is "off" when it is prevented from changing state, negligible power is consumed by that functional unit. This means that a functional unit that is off does not consume power, which results in the power consumption reduction. Since power consumption is reduced, the heat dissipation requirements and associated packaging of the system is reduced. In addition, when a battery source is used, it can be made smaller for a given operational period of time. Furthermore, because power consumption is reduced, the line width of power supply buses can also be reduced.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Figure 1:
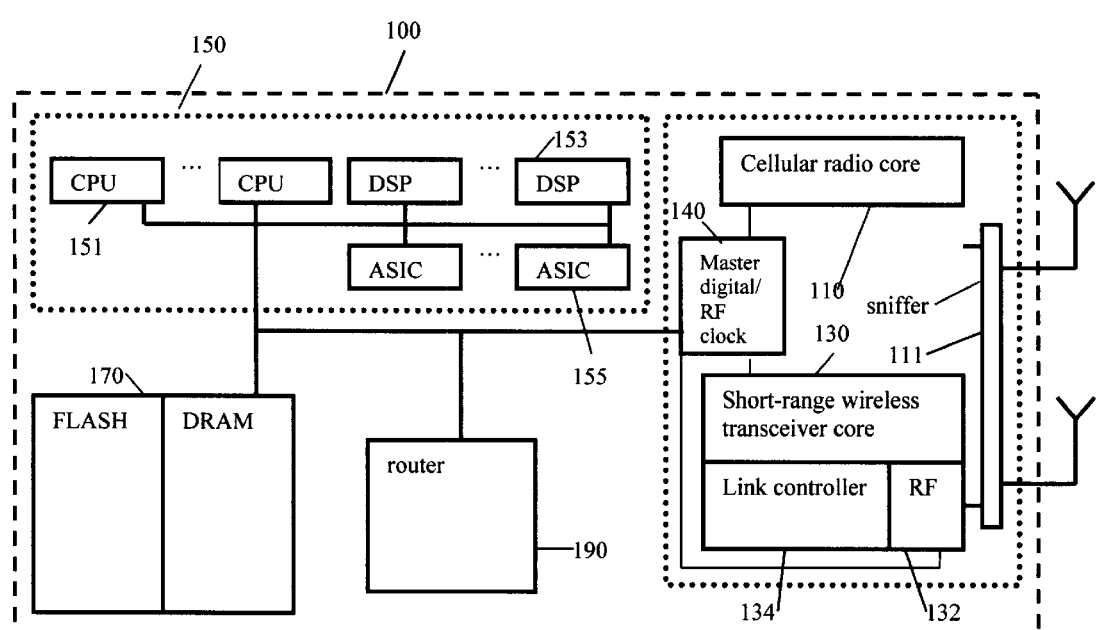
FIG. 1 is a block diagram of a single chip wireless communications integrated circuit.

FIG. 1 shows a block diagram of a multi-mode wireless communicator device 100 fabricated on a single silicon integrated chip. In one implementation, the device 100 is an integrated CMOS device with radio frequency (RF) circuits, including a cellular radio core 110, a short-range wireless transceiver core 130, and a sniffer 111, along side digital circuits, including a reconfigurable processor core 150, a high-density memory array core 170, and a router 190. The cellular core 110, the wireless transceiver core 130, and the processor core 150 receive clock signals from a clock controller 140. By clocking the cores 110, 130 and 150 using a common reference clock signal, the system simplifies the maintenance of clock signal integrity and minimizes the potential for errors from parasitic reactances, impedance mismatches, crosstalk, dispersion and frequency-dependent skin losses.

The clock controller 140 operates from the same input frequency (in this example, 2.4 GHz) and generates clocks for both digital and wireless circuits. The clock controller 140 optimizes speed, power, and radio frequency interference considerations. For example, if the user needs to download a Web cast where data is transmitted to chip from outside wirelessly, the clock controller 140 clocks the system at maximum speed where both the processor and RF circuits are clocked at 2.4 GHz.

For data going the opposite direction, the needed bandwidth is reduced. Hence, the clock controller 140 divides the 2.4 GHz clock down to a 1.2 GHz clock for the processor. Further, a second order harmonic of the 2.4 Ghz clock signal is used for the RF circuit. The controller 140 can also use the 2.4 GHz with a filter circuit to remove sharp clock edges for RF the circuit.

The clock controller 140 manages the generation of the clock signals to minimize undesirable EMI emissions that can cause interference. Generally, digital circuits switch quickly between predefined voltage levels, and consequently induce transient disturbances in signal and power lines, as well as energy radiated as electromagnetic waves. A digital circuit switching rapidly but regularly, with edges synchronous to a master clock, can generate noise with a strong spectral component at the clock frequency. Additionally, harmonics at odd multiples of the clock frequency will be generated. If the circuit remains synchronous to a master clock, but switches on random clock edges, spectral components above and below the clock frequency will also be generated. Digital circuits themselves are robust in the presence of noise from other sources. By contrast, analog circuits operate at a multiplicity of voltage levels and frequencies, and are sensitive to induced noise. The noise spectrum produced by dense, high-speed digital circuits can easily interfere with high-frequency analog components. Since the waveforms transitions generated by digital circuits are, at least ideally, step transitions having (in accordance with Fourier analysis) a wide noise bandwidth, potential interference of the chip's digital signals with the chip's analog signals poses a distinct threat to circuit performance.

In one embodiment, the clock controller 140 generates a processor clock signal at a frequency that is lower than the RF frequency (2.4 GHz in the case of Bluetooth) to avoid interference. Further, the controller 140 ensures that the edges of the clock do not generate harmonics that interfere with the 2.4 GHz frequency. In one implementation, the first harmonic of a 1.2 GHz signal is used as the 2.4 GHz carrier frequency.

When 2.4 GHz operation is desired, the clock is rapidly increased to 2.4 GHz with a suitable phase locked loop fed to both the processor core and the Bluetooth core. In one implementation, the edges of the clock signal generated by the PLL's voltage controlled oscillator are phase-modulated using a random-number sequencer in order to reduce the harmonic content of the resulting clock signal. The digital clock can be transformed into an analog carrier wave using a gaussian filter and a lowpass filter such as a high-order Chebyshev or Butterworth filter.

In one embodiment, the controller 140 varies the clock signal period to effectively spread the undesirable frequency harmonics spurs over the frequency band because the harmonic frequency created by the clock varies over time. The clock signal period can be varied using techniques such as those disclosed in U.S. Pat. Nos. 5,426,392 and 5,488,627, among others. The spurious signal energy at the nominal harmonic frequency is reduced and the energy is spread across the spectrum.

The clock trace can be used as an antenna, radiating the signal directly from its surface, removing the need for an external antenna. This system is adapted to work with transmitter with low output power levels, such as those specified by Bluetooth (0 dBm). The clock traces can also be used as a receive antenna to catch signals from a local radio source. The wiring traces act as an antenna, with the clock circuit spread out over the device. Since Bluetooth power output can be increased up to a watt, a Bluetooth™ transmitter can program devices even a few meters away using the clock trace antennas.

In addition to using clock traces and pads as an array of patch antennas, dedicated metal film lines on the device can be used. For instance, U.S. Pat. No. 5,381,157 to Shiga entitled "Monolithic microwave integrated circuit receiving device having a space between antenna element and substrate" uses a metal film constituting patch antennas about which are antenna elements of the planar antenna is also formed on the surface and is connected to circuit components by a first layer-metal line. The entire backside of the Shiga substrate is covered by a metal layer acting as a grounding conductor and connected to the first layer-metal line suitably by a via hole. The Shiga patch antennas have an air bridge structure as the metal film constituting the patch antennas is formed with a space above the surface of the substrate.

In one embodiment, the patch antenna can be used to get power off-chip, at least enough to power the processor clock and start the communication protocol for downloading data. For example, during wafer test, a high power 2.4 GHz signal can be beamed at the die, powering up the clock and carrying the data at the same time. The system can use Inductive Power Transfer with an AC-energized coil to create a magnetic field that couples with a receiving coil of an inductively powered device. The induced signal appearing at the output of the inductively powered device coil is then rectified and filtered to create a relatively constant DC power source. Alternatively, as discussed in U.S. Pat. No. 6,047,214, Magnetic Vector Steering (MVS) and Half-Cycle Amplitude Modulation (HCAM) techniques can be used to enhance the powering and control of multiple arbitrarily oriented devices. Together, these techniques enable arbitrarily oriented devices to receive power and command, programming, and control information in an efficient manner. By steering the aggregate magnetic field from a near-orthogonal set of AC-energized coils, selected devices can be powered or communicated with at desired times.

Even though for most RF operations the 2.4 GHz carrier signal is frequency hopping within a range of 2.4–2.48 GHz, this variation is not a problem for a digital clock. The typical BPSK modulation used by the wireless transmission also varies the clock frequency, but the variation is slow as compared to the carrier (for example around 0.001 ratio), that the processor will not encounter glitches (jitter is within acceptable limits). Operating the radio and the microprocessor at the same frequency has the advantage of locking the high power RF signal in step with the digital clock, thus reducing commonly encountered problems such as VCO frequency pulling and ground bounce during the RF low-high transitions.

The high-density memory array core 170 can include various memory technologies such as flash memory and dynamic random access memory (DRAM), among others, on different portions of the memory array core. The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

One exemplary processor embedded in the multiprocessor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units. The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver core 130 supports local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem 116 performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

Figure 2:
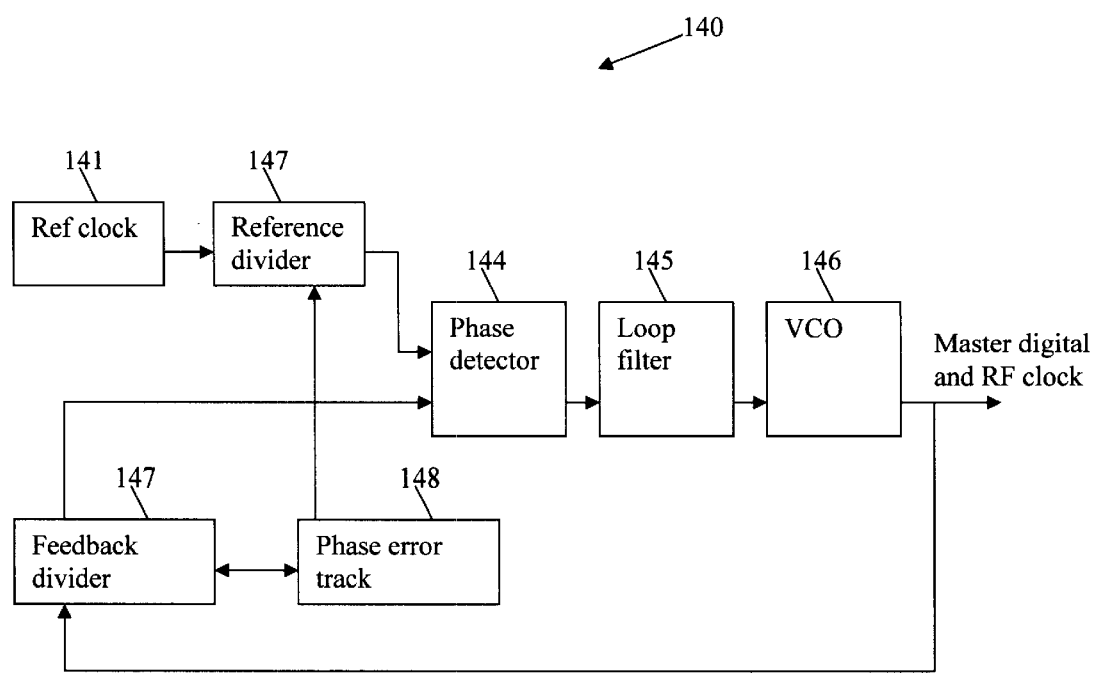
FIG. 2 is a block diagram of a clock controller embodiment.

FIG. 2 shows one implementation of a clock controller 140. The clock controller 140 receives a reference clock signal 141. The reference clock signal 141 can be generated off-chip, or alternatively, can be generated on-chip using an on-chip oscillator that can be crystal controlled, resistive-capacitive (RC) controlled, or can be a ring-oscillator. The reference signal 141 is provided to a frequency multiplier 142. In one embodiment, the frequency multiplier 142 generates a clock signal at 2.4 GHz. The clock signal can be supplied to both the processor core and a local oscillator for the wireless core. Since current generation of microprocessors uses frequencies in excess of 1 GHz, easily reaching the 2.4 GHz required for Bluetooth and 802.11 operation, the master clock can then be used to power the both. The clock can be filtered to remove spiking edges.

In one embodiment, the frequency multiplier 142 is a PLL with a phase detector 144, a loop filter 145, a voltage controlled oscillator ("VCO") 146, a reference divider 147, and a feedback divider 148. A low-pass filter (LPF) can be used to remove high frequency components from an error signal generated by the phase detector. The oscillation frequency of the VCO is controlled with the smoothed error signal to tune its output frequency to the input data. A fixed reference signal is transmitted to the reference divider 147 and then to one input of the phase detector 144. The output of the VCO 146 is divided by the feedback divider 148 and input to the other input of the phase detector 144. Although the frequency at the output of this implementation of the frequency multiplier 142 is an integer multiple of the frequency at the input of the phase detector, non-integer divider such as those in U.S. Pat. No. 6,236,278 can be used as well.

The controller 140 ensures that the edges of the clock do not generate harmonics that interfere with the 2.4 GHz frequency. In one implementation, the first harmonic of a 1.2 GHz signal is used as the 2.4 GHz carrier frequency. When 2.4 GHz operation is desired, the clock is rapidly increased to 2.4 GHz with a suitable phase locked loop fed to both the processor core and the Bluetooth core. In one implementation, the edges of the clock signal generated by the PLL's voltage controlled oscillator are phase-modulated using a random-number sequencer in order to reduce the harmonic content of the resulting clock signal. The digital clock can be transformed into an analog carrier wave using a gaussian filter and a lowpass filter such as a high-order Chebyshev or Butterworth filter.

The CPU performs complex calculations for wireless 802.11a/b transmission, while the Bluetooth transceiver/ radio or the 802.11 transceiver/radio is used for local 'last meter' transmission of data in a personal area network (PAN). To reduce power consumption, the clock frequency used by the processor core can be less than 2.4 GHz. This can be done by scaling down the 2.4 GHz clock signal with a clock divider. In this manner, a single clocking source can be used for a number of RF and digital operations.

Figure 3:
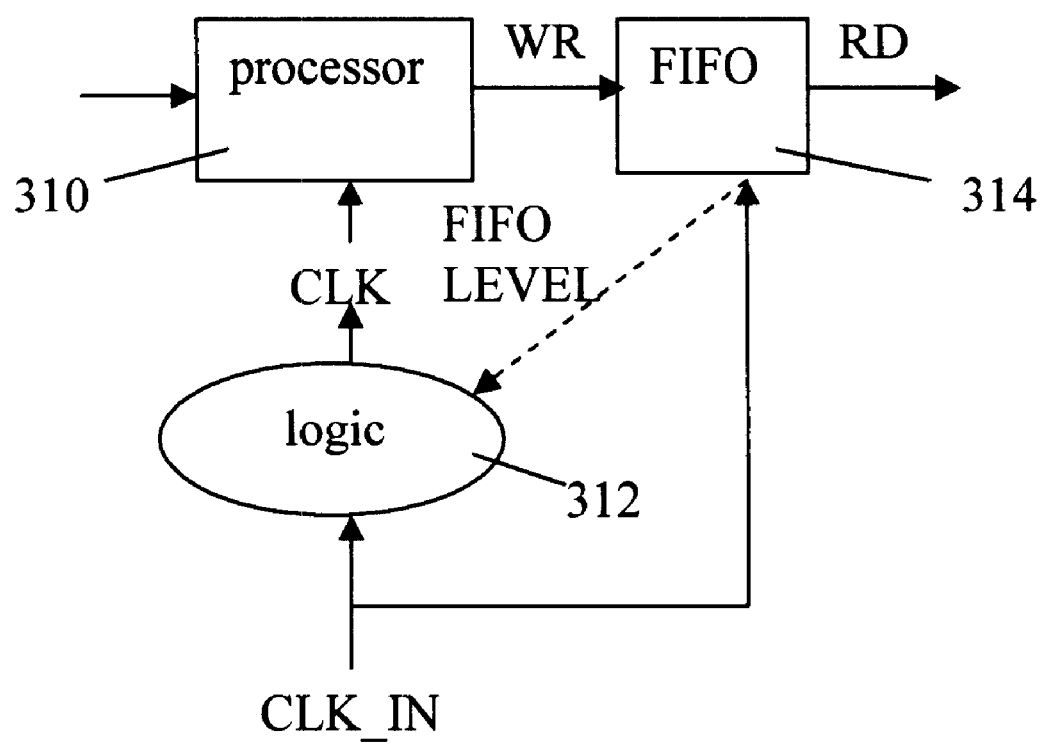
FIG. 3 is a block diagram of a first embodiment to conserve power consumption for a plurality of processing units operating in parallel.

FIG. 3 shows an exemplary embodiment to conserve power in a system with a plurality of processing elements or units 310, 312 314, 316 and 318. In this embodiment, processing units 310–312 operate in parallel, while processing units 314, 316, and 318 operate in seriatim based on the previous processing unit's outputs. Multiple instructions are executed at the same time in the different execution units 310, 312 314, 316 and 318, as long as these instructions do not contend for the same resources (namely, shared memory). As discussed below, power can be saved by varying the clock frequency, the core voltage or a combination thereof, if necessary, to reduce heat or to reduce battery power consumption.

Turning now to FIG. 3, a plurality of processing units operates in parallel. This embodiment relies on varying the clock signals to control power consumption. Each of the processing units 310, 312 314, 316 and 318 is powered by the same voltage rail. A master clock 302 supplies a master clock signal to a clock controller 304. The clock controller 304 determines for each application the appropriate clock signal that is applied to each of processing units 310, 312 314, 316 and 318. The controller 304 drives the clock input of each of processing units 310, 312 314, 316 and 318. The clock can be driven independently and can be based on the tasks to be performed. For example, a task-based clock scheme for an exemplary three-processor system at a particular time point is as follows:

| Processor | Task 1 | Task 2 | Task 3 | Task 4 | Task 5 |
|---|---|---|---|---|---|
| P0 | Clock | Clock | Clock*1/32 | Clock*1/32 | Clock*1/32 |
| P1 | Clock*1/16 | Clock*2/3 | Clock*1/4 | Clock*1/16 | Clock*1/32 |
| P2 | Clock*1/32 | Clock*5/32 | Clock*1/2 | Clock*1/2 | Clock*1/32 |

The table illustrates a sequence of clock management events in a multiple processing element system. Although the figure indicates all processor clocking management to occur coincidentally, generalization of the invention to include unsynchronized and/or gradual rate changes is a simple extension of the invention. Additionally subsets of processing elements may be grouped and managed together as ensembles.

The controller 304 can be implemented in hardware; or the power control may be implemented by means of software. If a high performance operating level of the core is not required for a particular application, software instructions may be utilized to operate the power control circuit. In one implementation, switching ability is no longer provided to the processing unit after a preselected clock cycle period after the processing unit has completed the required task of executing the machine code instruction of the computer program to turned off (de-activated) the unit after it has executed the required task.

Figure 4:
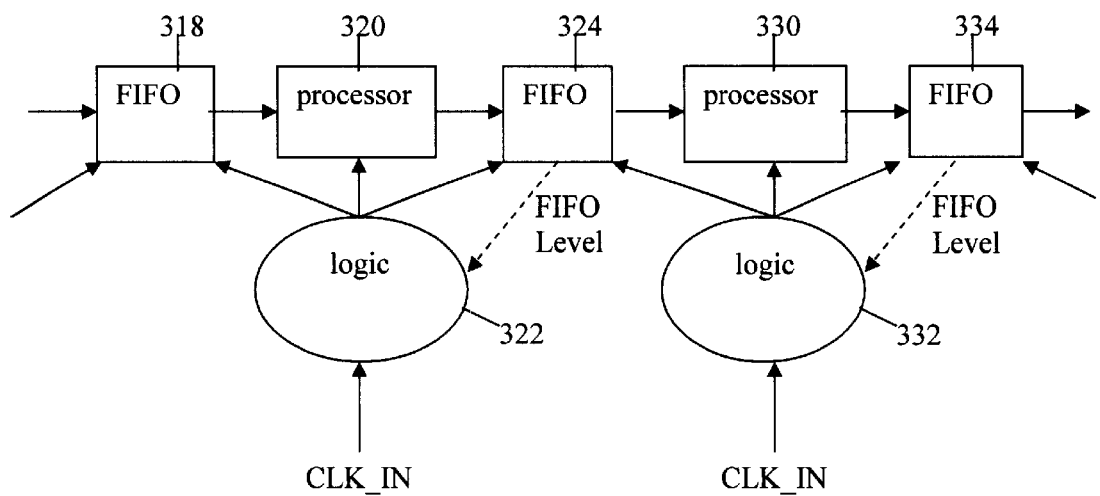
FIG. 4 is a block diagram of a second embodiment to conserve power consumption for a plurality of processing units operating in parallel.

FIG. 4 is a block diagram of a second embodiment to conserve power consumption for a plurality of processing units operating in parallel. This embodiment is similar to the embodiment of FIG. 3, except that the output of each of the sequential processing units 314, 316 and 318 is buffered by buffers 324, 326 and 328, respectively. In one embodiment, the buffers 324, 326 and 328 are first-in-first-out (FIFO) buffers.

Figure 5:
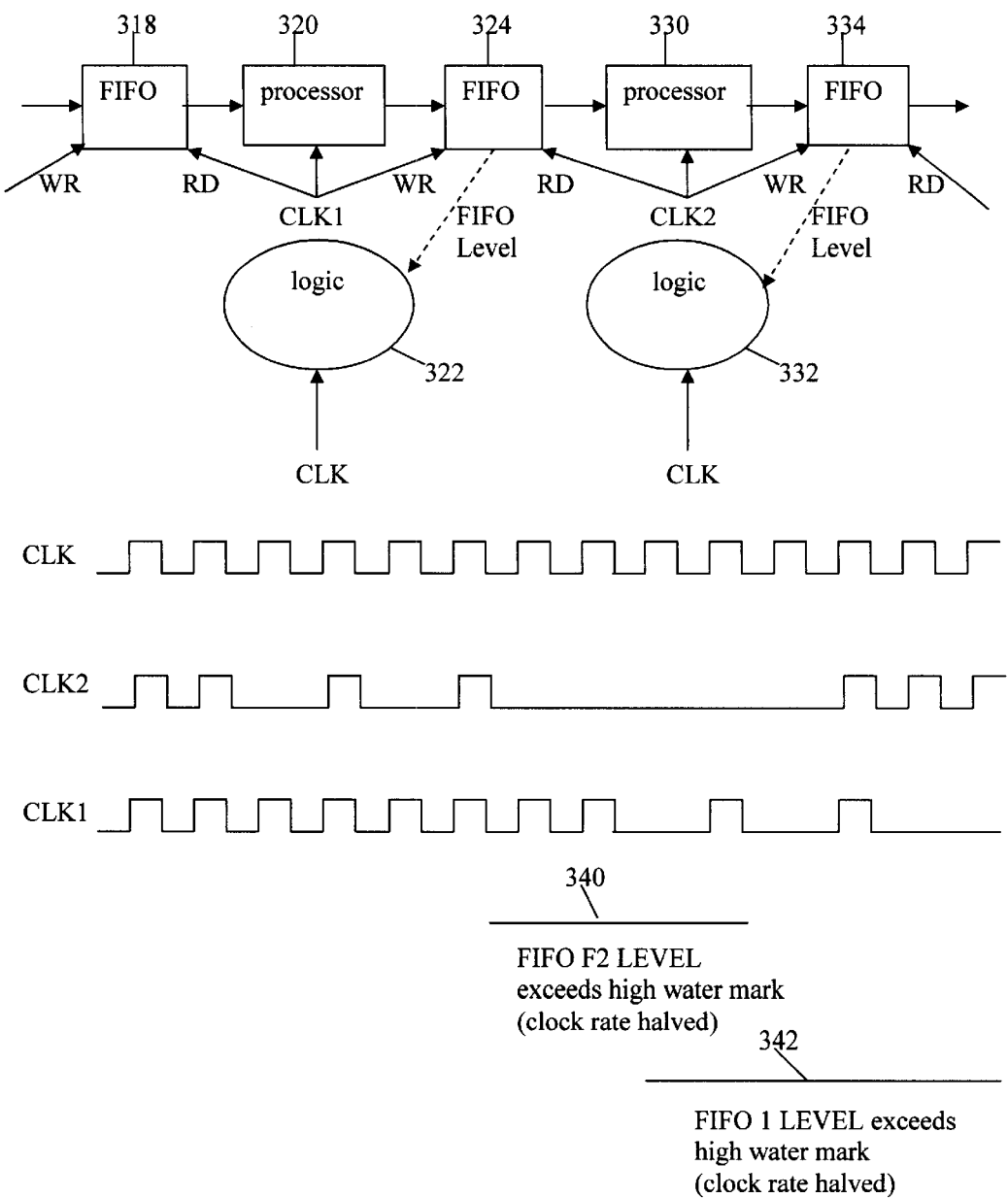
FIG. 5 is a block diagram of a third embodiment to conserve power consumption for a plurality of processing units operating in parallel.
Figure 6:
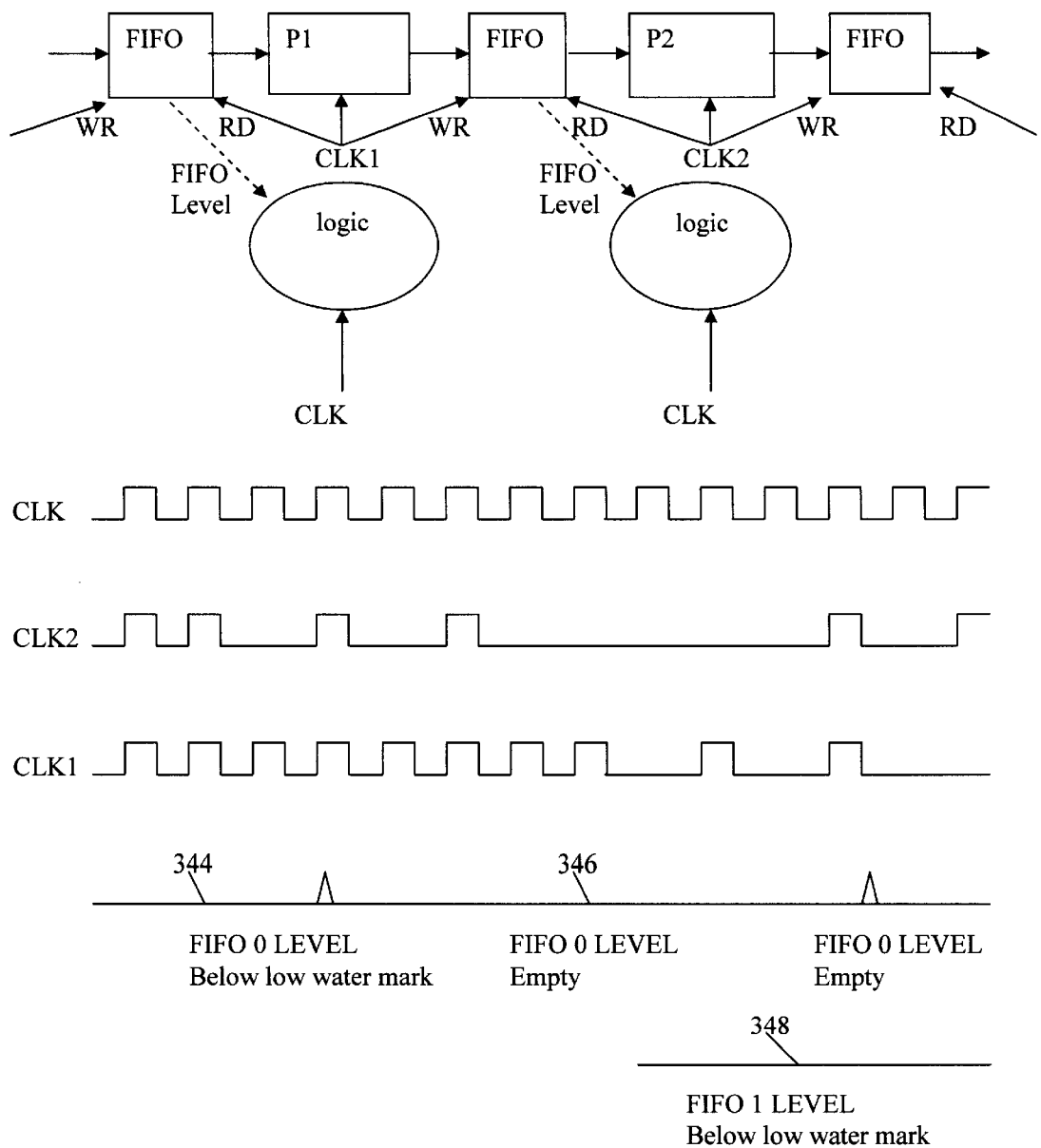
FIG. 6 is a block diagram of a fourth embodiment to conserve power consumption for a plurality of processing units operating in parallel.

FIG. 5 is a block diagram of a third embodiment to conserve power consumption for a plurality of processing units operating in parallel. This embodiment is also similar to the embodiment of FIG. 3, with the addition of a programmable voltage source 330. FIG. 6 is a block diagram of a fourth embodiment similar to the embodiment of FIG. 4, except that the buffered processing units operating in parallel at individually controlled supply voltages. In the embodiments of FIGS. 5–6, each of the processing units 310, 312 314, 316 and 318 is powered by independent voltage rails whose voltage can be varied within a predetermined range.

Figure 7:
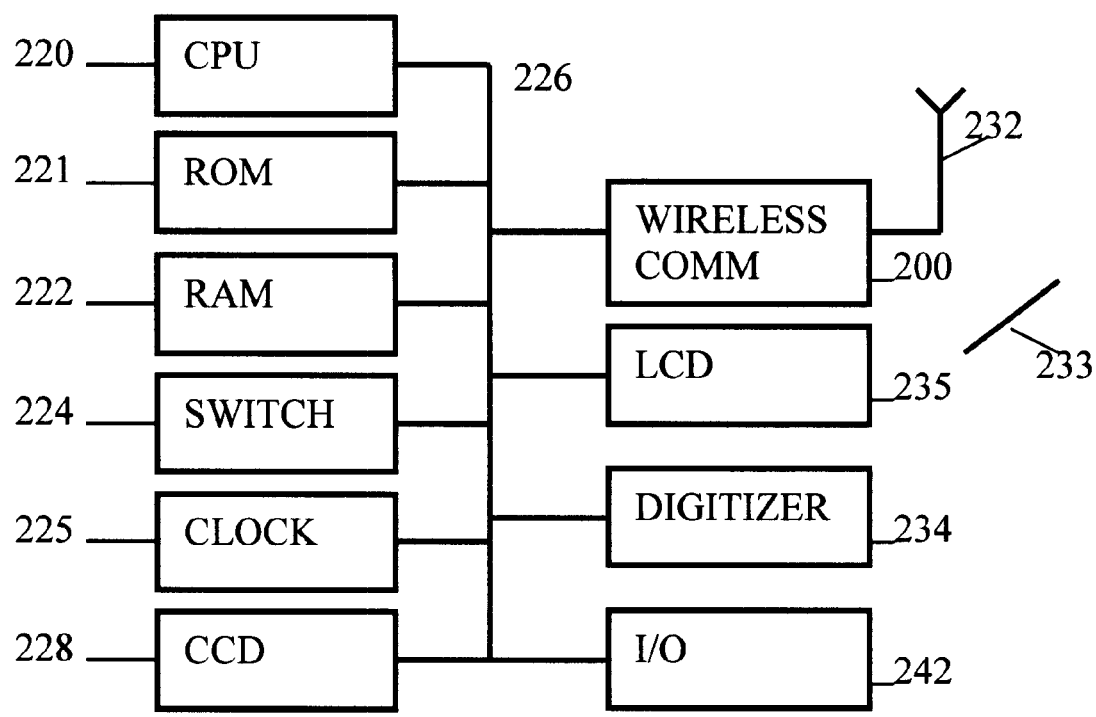
FIG. 7 is a block diagram of a portable computer system in accordance with the present invention.

FIG. 7 illustrates an exemplary computer system 200 with the wireless communication device 100. The computer system 200 is preferably housed in a small, rectangular portable enclosure. Referring now to FIG. 7, a general purpose architecture for entering information into the data management by writing or speaking to the computer system is illustrated. A processor 220 or central processing unit (CPU) provides the processing capability. The processor 220 can be a reduced instruction set computer (RISC) processor or a complex instruction set computer (CISC) processor. In one embodiment, the processor 220 is a low power CPU such as the MC68328V DragonBall device available from Motorola Inc.

The processor 220 is connected to a read-only-memory (ROM) 221 for receiving executable instructions as well as certain predefined data and variables. The processor 220 is also connected to a random access memory (RAM) 222 for storing various run-time variables and data arrays, among others. The RAM 222 is sufficient to store user application programs and data. In this instance, the RAM 222 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 221 for data back-up purposes.

The computer system 200 has built-in applications stored in the ROM 221 or downloadable to the RAM 222 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The computer system 200 receives instructions from the user via one or more switches such as push-button switches in a keypad 224. The processor 220 is also connected to a real-time clock/timer 225 that tracks time. The clock/timer 225 can be a dedicated integrated circuit for tracking the real-time clock data, or alternatively, the clock/timer 225 can be a software clock where time is tracked based on the clock signal clocking the processor 220. In the event that the clock/timer 225 is software-based, it is preferred that the software clock/timer be interrupt driven to minimize the CPU loading. However, even an interrupt-driven software clock/timer 225 requires certain CPU overhead in tracking time. Thus, the real-time clock/timer integrated circuit 225 is preferable where high processing performance is needed.

The processor 220 drives an internal bus 226. Through the bus 226, the computer system can access data from the ROM 221 or RAM 222, or can acquire I/O information such as visual information via a charged coupled device (CCD) 228. The CCD unit 228 is further connected to a lens assembly (not shown) for receiving and focusing light beams to the CCD for digitization. Images scanned via the CCD unit 228 can be compressed and transmitted via a suitable network such as the Internet, through Bluetooth channel, cellular telephone channels or via facsimile to a remote site.

Additionally, the processor 220 is connected to the multi-mode wireless communicator device 100, which is connected to an antenna 232. The device 100 satisfies the need to access electronic mail, paging, mode/facsimile, remote access to home computers and the Internet. The antenna 232 can be a loop antenna using flat-strip conductors such as printed circuit board wiring traces as flat strip conductors have lower skin effect loss in the rectangular conductor than that of antennas with round-wire conductors. One simple form of wireless communication device 100 is a wireless link to a cellular telephone where the user simply accesses a cellular channel similar to the making of a regular voice call. Also mention that one channel is reserved for making voice calls. Typically, data channels are not usable for voice communications because of the latency and low packet reliability, so a dedicated voice channel is necessary. In one implementation, GPRS, there are a total of 8 channels per user, one of which is dedicated to voice when the user decides to make a voice call. This voice connection is independent of the data connection.

The processor 220 of the preferred embodiment accepts handwritings as an input medium from the user. A digitizer 234, a pen 233, and a display LCD panel 235 are provided to capture the handwriting. Preferably, the digitizer 234 has a character input region and a numeral input region that are adapted to capture the user's handwritings on words and numbers, respectively. The LCD panel 235 has a viewing screen exposed along one of the planar sides of the enclosure are provided. The assembly combination of the digitizer 234, the pen 233 and the LCD panel 235 serves as an input/output device. When operating as an output device, the screen 235 displays computer-generated images developed by the CPU 220. The LCD panel 235 also provides visual feedback to the user when one or more application software execute. When operating as an input device, the digitizer 234 senses the position of the tip of the stylus or pen 233 on the viewing screen 235 and provides this information to the computer's processor 220. In addition to the vector information, the present invention contemplates that display assemblies capable of sensing the pressure of the stylus on the screen can be used to provide further information to the CPU 220.

The CPU 220 accepts pen strokes from the user using the stylus or pen 233 that is positioned over the digitizer 234. As the user "writes," the position of the pen 233 is sensed by the digitizer 234 via an electromagnetic field as the user writes information to the computer system. The digitizer 234 converts the position information to graphic data. For example, graphical images can be input into the pen-based computer by merely moving the stylus over the surface of the screen. As the CPU 220 senses the position and movement of the stylus, it generates a corresponding image on the screen to create the illusion that the pen or stylus is drawing the image directly upon the screen. The data on the position and movement of the stylus is also provided to handwriting recognition software, which is stored in the ROM 221 and/or the RAM 222. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 242 which allow the CPU 220 to communicate with other computers. Each of the I/O ports 242 may be a parallel port, a serial port, a universal serial bus (USB) port, a Firewire port, or alternatively a proprietary port to enable the computer system to dock with the host computer. In the event that the I/O port 242 is housed in a docking port, after docking, the I/O ports 242 and software located on a host computer (not shown) support an automatic synchronization of data between the computer system and the host computer. During operation, the synchronization software runs in the background mode on the host computer and listens for a synchronization request or command from the computer system 200 of the present invention. Changes made on the computer system and the host computer will be reflected on both systems after synchronization. Preferably, the synchronization software only synchronizes the portions of the files that have been modified to reduce the updating times. The I/O port 242 is preferably a high speed serial port such as an RS-232 port, a Universal Serial Bus, or a Fibre Channel for cost reasons, but can also be a parallel port for higher data transfer rate.

One or more portable computers 200 can be dispersed in nearby cell regions and communicate with a cellular mobile support station (MSS) as well as a Bluetooth station. The cellular and Bluetooth stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/ Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet. As packets of information travel across the Internet, routers throughout the network check the addresses of data packages and determine the best route to send them to their destinations. Furthermore, packets of information are detoured around non-operative computers if necessary until the information finds its way to the proper destination.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A low power a reconfigurable processor core, comprising:
   a plurality of processor units, each unit having a clock input that controls the performance of the unit;
   a wireless transceiver transmitting and receiving at a frequency based on a wireless clock input; and
   a controller having a plurality of clock outputs each coupled to the clock input of the each processor unit, the controller varying the clock frequency of each processor unit and the wireless clock input, the clock outputs being generated from a common master clock.

2. The processor core of claim 1, wherein the common master clock operates at the same frequency as a Bluetooth frequency or an 802.11 frequency.

3. The processor core of claim 1, wherein one of the processor unit comprises a digital signal processor (DSP) or a reduced instruction set computer (RISC) processor.

4. The processor core of claim 1, wherein each unit is dynamically managed on a per-task basis.

5. The processor core of claim 1, wherein each unit is clocked at the lowest rate possible to reduce peak power dissipation, reduce average power dissipation, or minimize buffer memory size and power.

6. The processor core of claim 1, wherein the controller generates a plurality of clock signals, each independently rate controlled to each processor unit.

7. The processor core of claim 1, wherein the master clock is approximately 2.4 Gigahertz.

8. The processor core of claim 1, wherein the plurality of clocks comprise gated versions of a master clock.

9. The processor core of claim 1, wherein the controller changes the clock rate of each processor unit independently of the remaining processor unit.

10. The processor core of claim 9, wherein the clock rate is generated based on an algorithm.

11. The processor core of claim 10, wherein the algorithm is optimized for one of the following: power reduction, buffer memory management, or emissions control.

12. The processor core of claim 11, wherein the algorithm is pre-assigned based upon tasks or routines handled by each processor unit.

13. The processor core of claim 11, wherein the algorithm is invoked by one or more external or internal system stimuli.

14. The processor core of claim 1, wherein the controller changes on or more clock inputs on-the-fly.

15. The processor core of claim 1, wherein the controller controls one or more clock inputs in a centralized manner.

16. The processor core of claim 1, wherein the controller controls one or more clock inputs in a decentralized manner.

17. The processor core of claim 1, wherein the controller controls one or more clock inputs.

18. The processor core of claim 1, further comprising one or more clock traces coupled to the controller.

19. The processor core of claim 18, wherein each clock trace comprises an antenna.

20. The processor core of claim 18, wherein each clock trace receives power from an external power source.

* * * * *